April 17, 1951 H. C. COGAN 2,549,173
SEAM WELDING OF CYLINDRICAL ARTICLES
Filed March 1, 1947 12 Sheets-Sheet 1

INVENTOR
HOWARD C. COGAN
BY
ATTORNEY

INVENTOR
HOWARD C. COGAN
BY
ATTORNEY

April 17, 1951          H. C. COGAN          2,549,173
SEAM WELDING OF CYLINDRICAL ARTICLES
Filed March 1, 1947          12 Sheets-Sheet 4
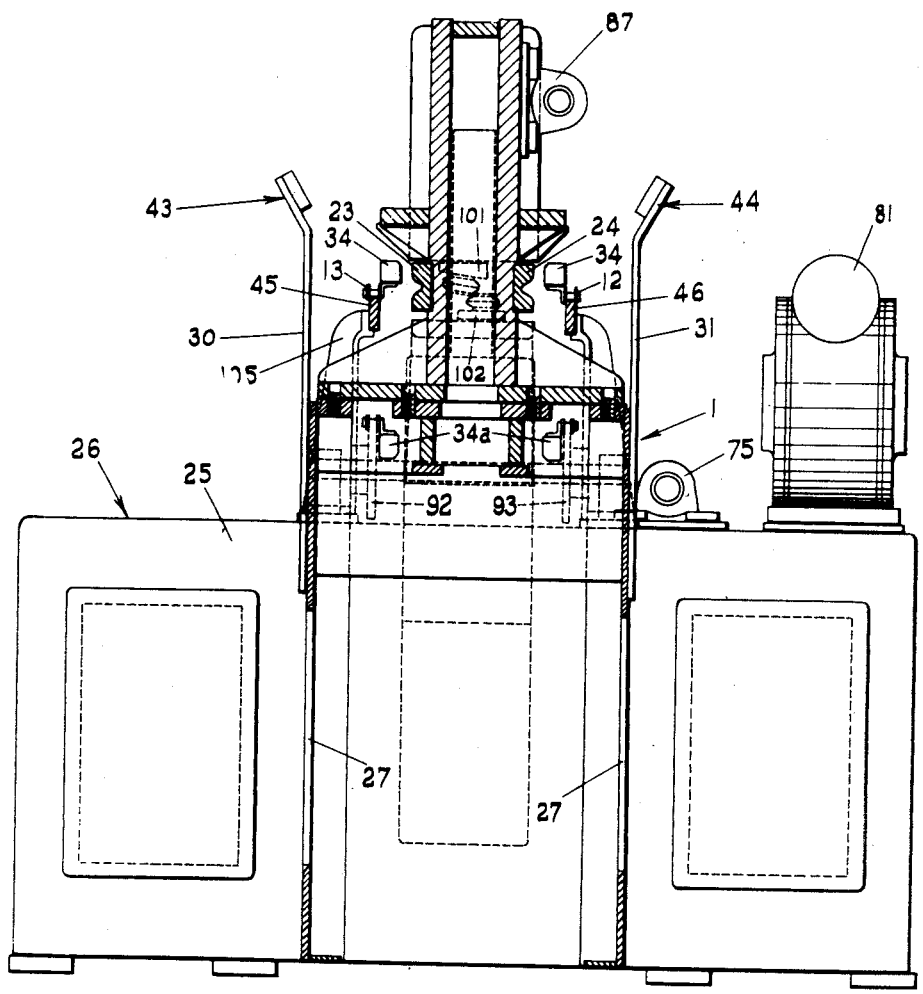
FIG. 4
INVENTOR
HOWARD C. COGAN
BY
ATTORNEY

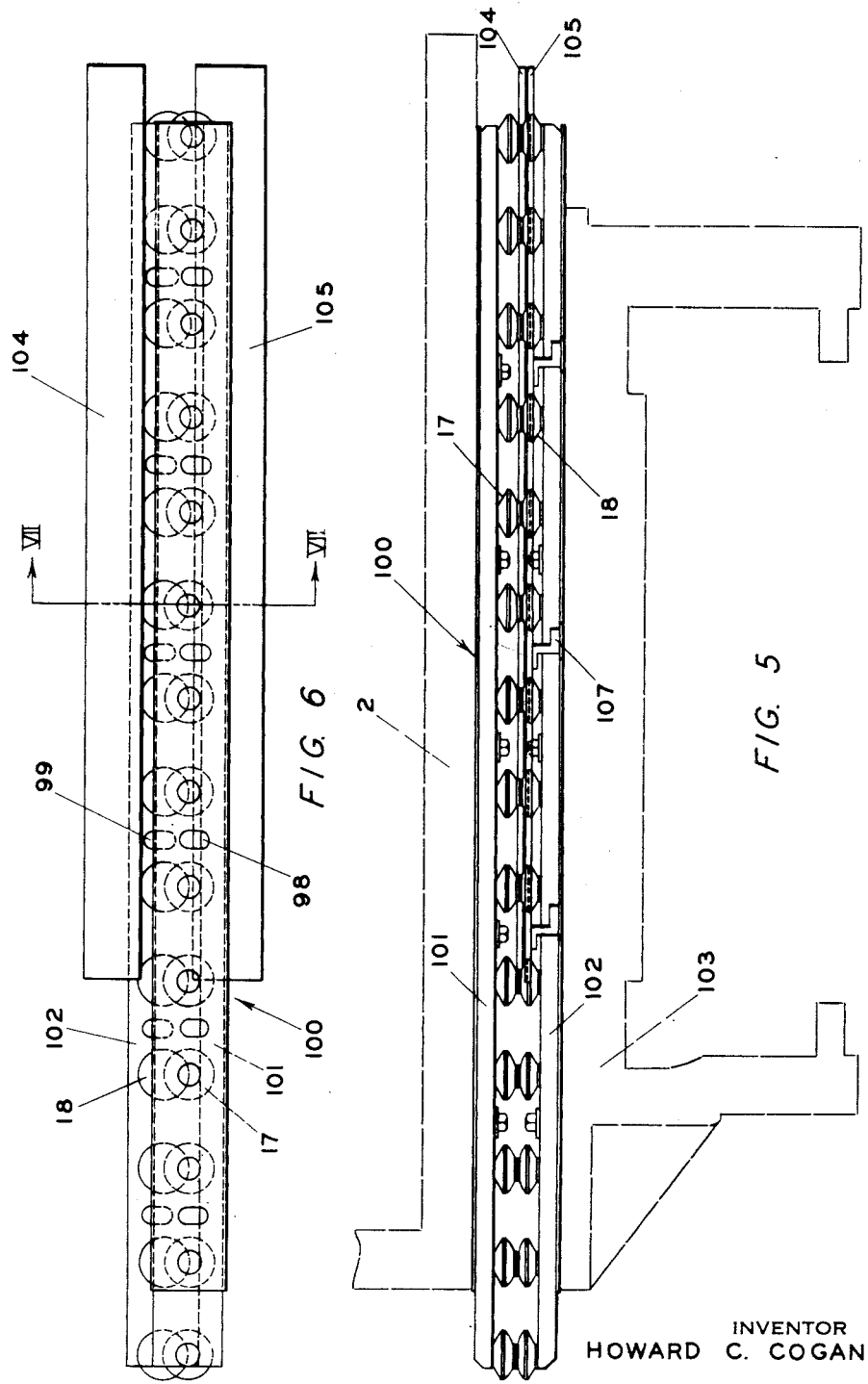

April 17, 1951
H. C. COGAN
2,549,173
SEAM WELDING OF CYLINDRICAL ARTICLES
Filed March 1, 1947
12 Sheets-Sheet 6
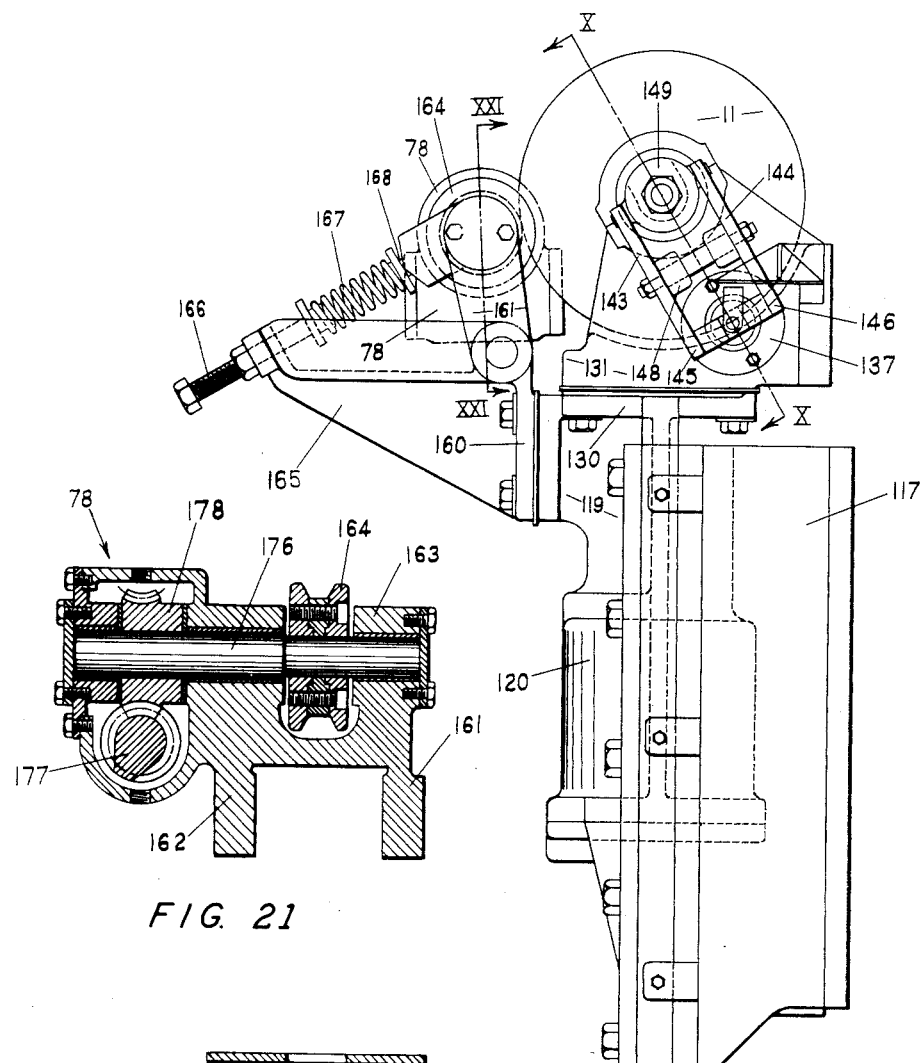
FIG. 21
FIG. 8
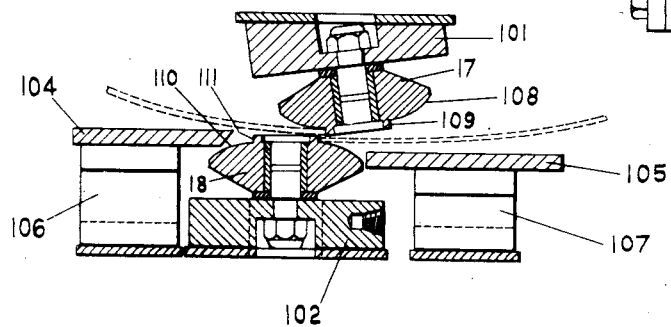
FIG. 7
INVENTOR
HOWARD C. COGAN
BY
ATTORNEY April 17, 1951        H. C. COGAN        2,549,173
SEAM WELDING OF CYLINDRICAL ARTICLES
Filed March 1, 1947        12 Sheets-Sheet 9

INVENTOR
HOWARD C. COGAN

April 17, 1951 H. C. COGAN 2,549,173
SEAM WELDING OF CYLINDRICAL ARTICLES
Filed March 1, 1947 12 Sheets-Sheet 10
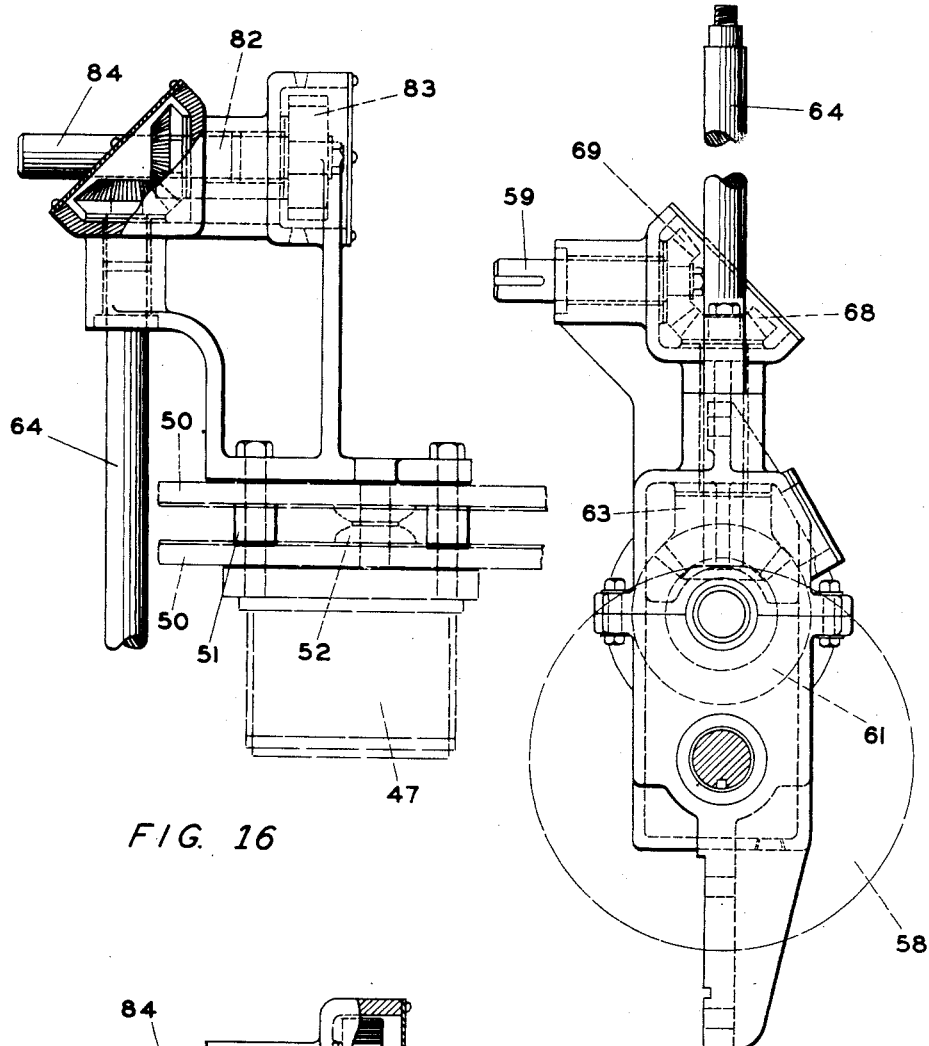
FIG. 16
FIG. 15
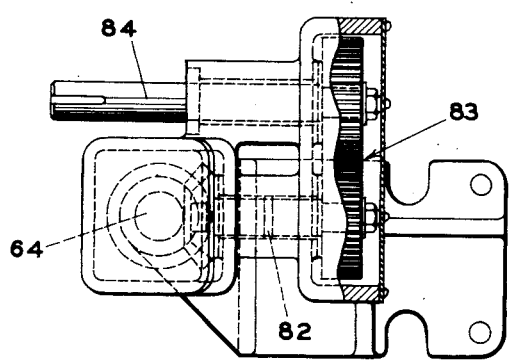
FIG. 17
INVENTOR
HOWARD C. COGAN
BY
ATTORNEY April 17, 1951     H. C. COGAN     2,549,173
SEAM WELDING OF CYLINDRICAL ARTICLES
Filed March 1, 1947     12 Sheets-Sheet 11
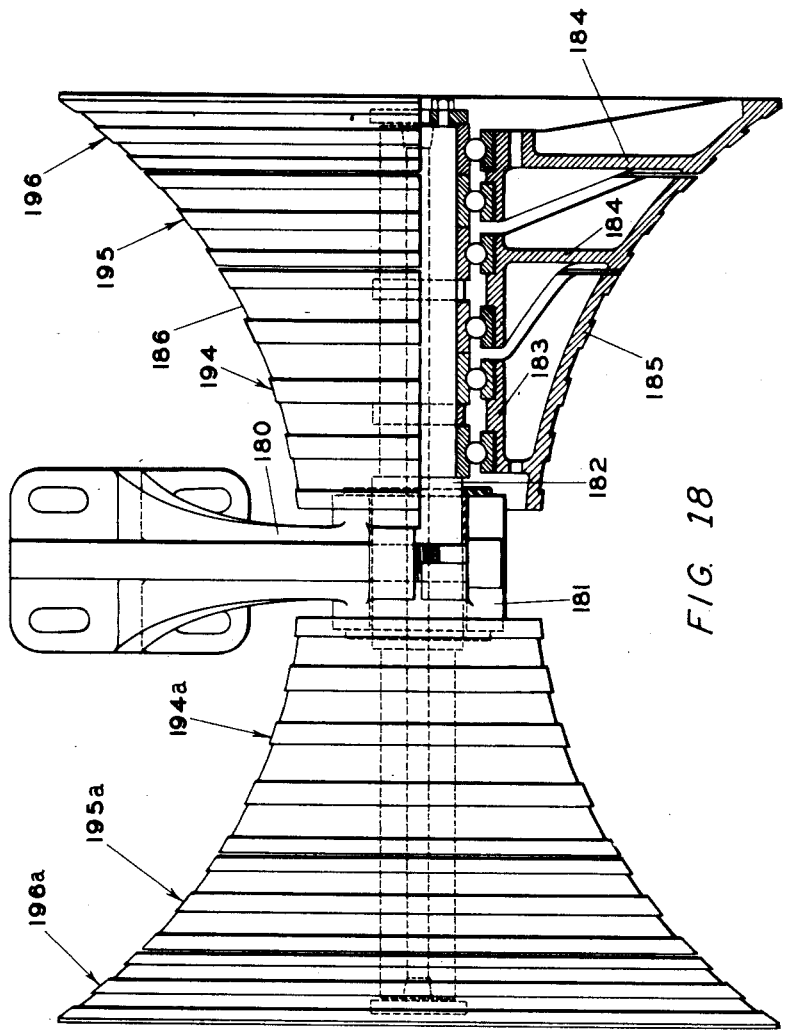
INVENTOR
HOWARD C. COGAN
BY
ATTORNEY April 17, 1951 H. C. COGAN 2,549,173
SEAM WELDING OF CYLINDRICAL ARTICLES
Filed March 1, 1947 12 Sheets-Sheet 12

INVENTOR
HOWARD C. COGAN
BY
ATTORNEY

Patented Apr. 17, 1951

2,549,173

UNITED STATES PATENT OFFICE 2,549,173

SEAM WELDING OF CYLINDRICAL ARTICLES

Howard C. Cogan, Bay City, Mich., assignor to National Electric Welding Machines Company, Bay City, Mich., a corporation of Michigan Application March 1, 1947, Serial No. 731,733

5 Claims. (Cl. 219—6)

This invention relates to the seam welding of substantially cylindrical articles and relates particularly to a method, and machine for practicing said method, whereby a plurality of such articles may be passed through appropriate seam welding means and discharged therefrom without reversing the direction of movement of said articles or materially, if at all, altering their speed of movement.

While the welding of continuous tubing has been feasible for a long period of time, it has hitherto not been feasible to weld cylindrical articles of relatively large diameter by a continuous process, excepting by methods which either gave unsatisfactory results or were awkward to handle.

In the welding of such articles of relatively large diameter, or of diameter large relative to the thickness of the material from which the article is made, it appears to be most desirable to overlap the sheet material slightly and then contact opposite sides of the lapped area by suitably positioned and suitably energized welding electrodes. This necessarily places one of the welding electrodes and the means for its support and energizing within the zone encompassed by the cylindrical article. The necessary support for such welding means within the cylindrical article has normally been provided by a long extending arm onto which the cylindrical article can be placed by movement in one axial direction and from which it can be removed by movement in the opposite direction. The welding operation may take place during either of said movements.

While the foregoing comments have been directed toward the making of lapped seams joined by any form of resistance welding, it is evident that the same will apply to either lapped or buttseams joined by any usual form of welding. Because in all cases in which the diameter of the cylindrical article is large relative to the thickness of the material from which it is made, there must be some form of guiding means on that side of the material being joined which is within the zone encompassed by such article, and said guiding means, whether or not it includes a welding electrode, must be supported in some manner. Where lap-welding is involved, such guiding means will include means for gaging and maintaining the desired lap of the sheet being welded.

In manufacture of cylindrical articles, such as barrels, it is desirable for reasons of economy in fabrication that the welding machine be constructed to receive a sheet of material pre-bent into a form substantially approximating its finished form, to guide said sheet into such position that the meeting or lapping edges are held together in proper position relative to each other, then, immediately, to weld said edges together, either continuously or intermittently as desired, and to discharge the welded articles from the machine, in one continuous and uni-directional operation. While no part of this invention, it may also be desirable to provide a metal bending machine in operative cooperation with the welding machine which will receive flat sheet material, bend it into suitable shape for delivery to the welding machine and then automatically deliver it to the welding machine for welding as aforesaid. Such a machine is shown in my co-pending application Serial Number 728,662 filed on February 14, 1947, now Patent No. 2,466,653, dated April 5, 1949.

In providing a method for accomplishing the aforesaid results it has been desirable to require in such method only those steps which could be carried out by a machine of relative simplicity, a machine of easy and accurate adjustability, and one comprising throughout such sturdiness and stability that replacement and re-adjustment of parts may be held to a minimum. In this respect, since the electrodes are in the form of rolls and are subjected to a welding pressure, it is particularly desirable to provide such electrodes with means for minimizing the destructiveness of the wear thereon.

Accordingly, a major object of the invention is to provide a method, and apparatus for carrying out said method, by which sheet material may, after being bent into a cylindrical shape of large diameter relative to the thickness of such material, be accurately positioned and welded together in a continuous, uni-directional and completely automatic manner.

A further object of the invention is to provide a process, as aforesaid, which will cooperate readily with a machine for bending flat sheet material into approximately that shape desired for convenient automatic reception by the said welding machine from said bending machine.

A further object of the invention is to provide a method, as aforesaid, which can be practiced by a machine of relative simplicity, in view of the type of operation being carried out, and a machine of great durability, easy adjustability, and capable of running for long periods without re-adjustment or other attention.

A further object of the invention is to provide a machine carrying out the objects and purposes above outlined.

A further object of the invention is to provide a machine, as aforesaid, capable of operating continuously with a high degree of accuracy.

A further object of the invention is to provide a machine in which the operations above described are fully automatic.

A further object of the invention is to provide a machine for continuous seam welding in which the electrodes will have a longer period of life than in presently known machines.

Other objects and purposes of the invention will be apparent to persons acquainted with methods and machines of this general type upon inspection of the accompanying drawings and reading of the following disclosure.

For the purpose of meeting the above outlined objectives I provided a method and machine specifically adapted to electrical resistance welding. Such machine may be readily adapted either to gas or to arc welding so that the following disclosure in terms of electrical resistance welding should be understood as illustrative and not as limiting. A specific embodiment of my invention comprises a relatively long and narrow table, having a conveyor operating substantially along its full length and having a pair of roller electrodes at one end. The lower electrode is rotatably mounted directly onto the table, is suitably aligned with the conveyor for contacting the outside of the parts to be welded as same are coming off the conveyor. Suitable means are provided for driving said lower electrode roller rotatably at a preselected speed. Directly above the lower electrode roller another electrode roller is rotatably mounted at the free end of an electrode supporting arm of sufficient length to permit the proper joining of the parts to be welded at the point of welding. The specifically illustrated embodiment being a machine for welding cylindrical articles of specific length, as distinguished from tubing, the arm is preferably a little longer than the length of the particular article which the machine is designed to handle. At the end of said arm, opposite to that upon which said upper electrode is supported, is provided neck means supporting said arm on said table. Normally, such neck will be as narrow as possible and elements of the conveyor will pass on either side thereof. Electrical energy, mechanical power, cooling fluid and lubrication for said upper electrode are all supplied thereto through said neck and arm.

The sheet material, bent into cylindrical form on a radius of curvature a little smaller than that of the finished article, is fed to the machine and engaged by suitable propelling means associated with the conveyor and is caused to pass along said table toward said neck. Upon reaching such part, suitable guides cause the meeting edges of the said sheet material, or preform, to be spread apart sufficiently to pass said neck. After said neck is passed, other guiding elements, together with certain magnetic effects induced into the sheet as hereinafter described, cause said edges to come together in overlapped relation to each other and thence, while held in such overlapped relation with the remainder of said sheet material comprising the barrel encompassing the arm supporting the upper welding element, here an electrode roller, said overlapped edges are caused to pass through a welding zone and welded in a conventional manner.

Said magnetic effect is induced into the cylindrical sheet as said sheet surrounds said upper electrode arm by virtue of the magnetic field set up about the electrical conductor, which runs along said arm and supplies energy to the upper electrode supported thereon. Thus, the magnetic effect, which causes said edges of said preform to grip the guides firmly as said preform surrounds said upper electrode arm, further minimizes the possibilities for accidents and errors.

In providing means, in conjunction with the above described machine as applied to electrical resistance welding for lapped parts, by which the electrode rollers may be caused to have longer life than is usual in such equipment, the said rollers are made wider than the seam in question and are moved from side to side with respect to the seam being welded, by which the center of pressure on the peripheral faces of the rollers is caused to reciprocate and thus spread the wear thereon over the entirety of such faces. It is preferred that the seam be held and the rollers reciprocated, but the rollers may be held and the parts comprising the seam reciprocated. The rollers may be reciprocated simultaneously with respect to each other or oppositely if desired without going beyond the scope of the invention. In the embodiment herein disclosed the rolls are eight times as wide as the seam, however this ratio may be changed freely as desired.

In the welding machine herein utilized as an illustrative embodiment of the invention, there are a large number of parts which are conventional and well known to those persons acquainted with the building and/or operation of automatic welding equipment of this general type. Hence, except where necessary for clarity of understanding, detailed reference and/or illustration of such parts will be omitted and it will be understood that any conventional means may be supplied effecting the purposes needed, whether the same be expressly described, implied or even omitted entirely. The said description will be given only in such detail as will be required to enable persons acquainted with this type of equipment to understand and practice the invention.

In the drawings:

Figure 4 is a section taken on the line IV—IV of Figure 1.

Figure 5 is a detailed side elevation view of lap gauge rollers.

Figure 6 is a top plan detail view of the lap gauge rollers.

Figure 7 is a section taken on the lines VII—VII of Figure 6.

Figure 8 is a side elevation detail of the portions associated with and supporting the lower welding electrode.

Figure 15 is a side elevation phantom detail of the parts shown in Figure 14 taken from the leftward side thereof as appearing in Figure 14.

Figure 16 is a side elevation detail of the upper gear box assembly which is shown separate from the associated mechanism.

Figure 17 is a top plan detail of the parts shown in Figure 16.

Figure 18 is a detail partially in central section of the uppermost of the forming rolls shown separated from the associated supports.

Figure 21 is a detail of the electrode driving gear box taken as a section on line XXI—XXI of Figure 8.

*General organization*

Figure 1:
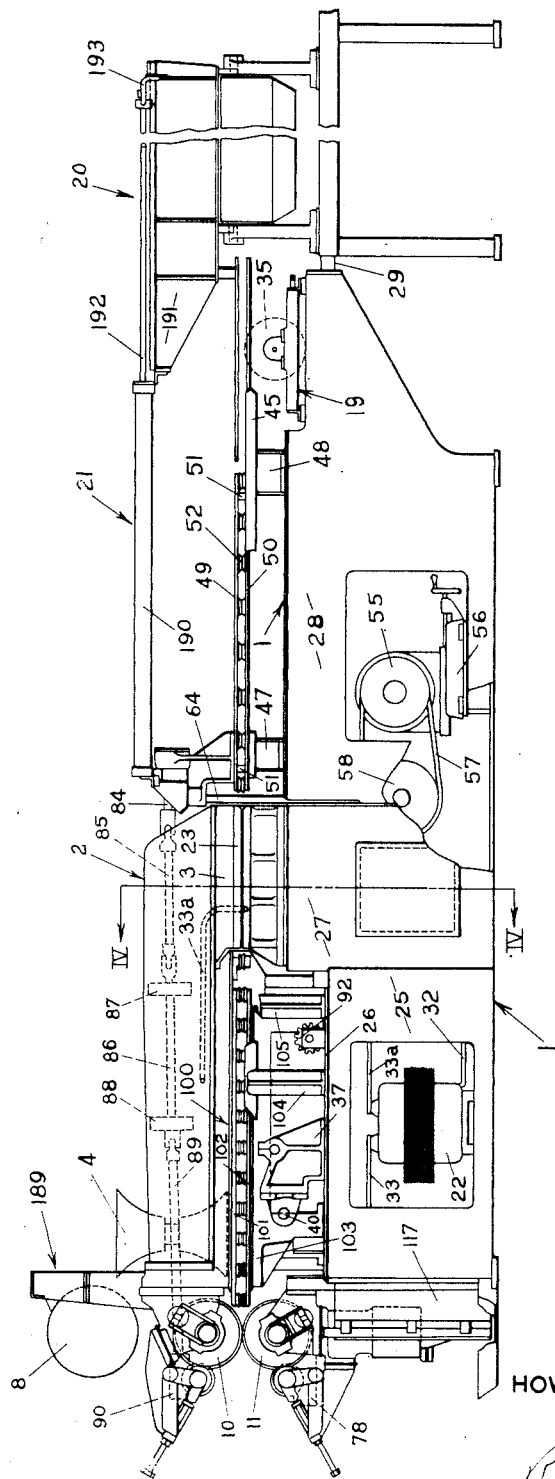
Figure 1 is a side elevation of a machine embodying the invention.

Referring now to the drawings, there is provided a base 1 supporting an arm 2 by and on a neck 3. For convenience of reference hereinafter, parts or directions at or toward the rightward end of the machine as appearing in Figure 1 will be referred to as "forward" or "forwardly" and parts or directions at or toward the leftward end of the machine as appearing in Figure 1 will be referred to as "rearward" or "rearwardly." Said arm 2 substantially parallels the upper side of the base 1 and in this particular machine it is of length sufficient to provide, between the rearward edge of the neck 3 and the rearward end of said arm, space equal to or greater than the axial length of the axially longest cylindrical articles to be welded by this machine. At the rearward end of the machine there is provided a first group, here a pair, of forming rolls 4 and 5 with vertical axes and a second group, here three, of forming rolls 6, 7 and 8 with axes angularly disposed to each other. Properly positioned to cooperate with the forming rolls in welding the seam in said cylindrical articles are a pair of electrode rollers 10 and 11, the upper electrode 10 being supported on the rearward end of the arm 2 and the lower electrode 11 being supported on the rearward end of the base 1. Means effecting axial oscillation of the electrodes 10 and 11, which means is disclosed in part hereinafter, is fully described and claimed in my copending continuation application Serial No. 116,706, filed September 20, 1949.

Figure 2:
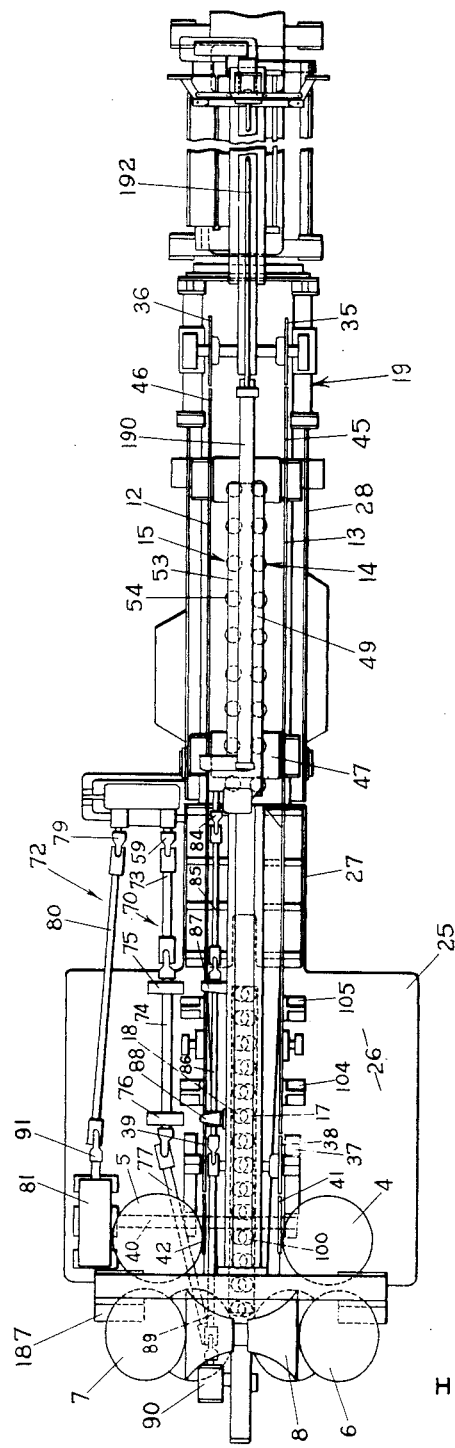
Figure 2 is a top plan view of said machine.
Figure 3:
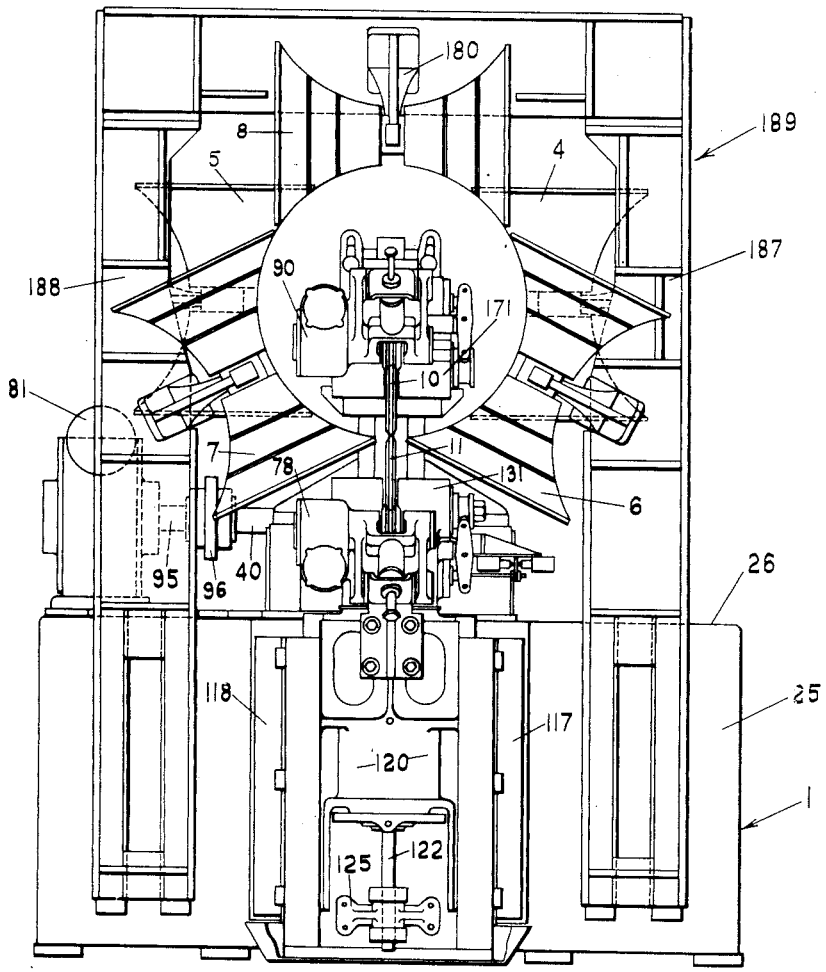
Figure 3 is an end elevation looking at the leftward end of the machine as appearing in Figure 1.

A pair of conveyors 12 and 13, which appear both in Figure 2 and Figure 4, run the full length of the upper side of the base 1 and carry suitably bent sheets of material, received at the forward end of the machine, toward the rearward end of the machine. The spaced roller guides series 14 and 15 extend from the forward end of the conveyor to the neck 3 and are sufficiently spaced apart that the sheet of cylindrically bent material to be welded will be held sufficiently apart at its adjacent edges that said edges will easily pass said neck. After passing said neck said cylindrical article will be received by the first group of forming rolls, comprising rolls 4 and 5, which force said adjacent edges against the lap guide rollers 17 and 18 by which the said edges are correctly lapped, whereupon they are fed between the electrode rollers for welding.

Thus the machine receives pre-formed sheet material at its forward end, carries it past the neck of the upper electrode support and feeds it through a welding zone with a continuous, steady and uni-directional movement.

The preformed sheets may be supplied to the welding machine, herein illustrated and described, from any convenient source, which source may be a conveyor carrying the preforms from the bending machine itself, or said preforms may even be fed into the welding machine from a stock pile adjacent the machine. For illustrative purposes a suitable bending machine 20, from which a preform is drawn onto the conveyor of the welding machine by an automatic preform feeder actuating cylinder 21, is indicated fragmentarily in Figures 1 and 2.

*The frame*

Referring now in more detail to the various parts of the machine, the base 1 comprises a plurality of frame members assembled in any convenient manner for supporting the parts hereinafter described. As illustrated herewith the frame comprises angle and sheet material of generally rectangular construction, having a relatively wide rearward section 25 with an upper sheet 26 for the support of hereinafter mentioned parts. Said rearward section 25 houses within its frame work a transformer 22 having input leads 32 from a suitable source of electrical power, and output leads 33 and 33a to the welding electrode rollers, through any suitable heat and timing control means. Since the electrical power transmission and connection means to and from both the transformer and the electrode rollers, as well as the method and apparatus for controlling the power supply to said electrodes, are conventional, no description will be made thereof. Forwardly of the rearwardly section 25 is a relatively narrow intermediate section 27 supporting the neck 3 and through it the upper electrode supporting arm 2. Through said neck and arm are passed the mechanical and electrical power, lubrication and cooling fluid for the upper electrode, which is mounted thereon. A fragment of the electrical conductor 33a energizing the upper electrode is indicated in phantom along the upper electrode arm in Figure 1. Within said intermediate section 27 may be placed convenient means, not shown, by which lubrication is introduced in a small, continuous flow into the bearings which support the electrode rollers 10 and 11. Extending forwardly from this intermediate section 27 is a forward section 28 likewise of rectangular construction and of the same width and height as the intermediate section and extending forwardly therefrom a sufficient distance to support the conveyors and associated preform receiving and guiding mechanism. As illustrated, the mechanism for bending sheet material into preforms may be affixed rigidly to the extreme forward end of this section at 29 but this is a matter of choice.

Within said section 28 are housed a suitable prime mover and an adjustable base attached thereto which will be elaborated upon hereinafter.

The three heretofore mentioned sections 25, 27 and 28 will be secured rigidly together, as by bolting and/or welding.

*The conveying and guiding mechanism*

At the receiving end of the conveyor there is provided a pair of conveyor supporting sprockets 35 and 36. These are rotatably supported upon a shaft and bearing assembly indicated at 19, which assembly may, if desired, be by means not shown made adjustable longitudinally of the machine, upon which it is mounted, for the purpose of maintaining the desired tension on said conveyor linkage 12 and 13.

Near the rearward end of the conveyor there is provided a conveyor support and drive assembly (Figures 1, 2 and 19) comprising a conveyor support base member 37 supporting in suitable bearings a pair of supporting and guiding sprockets 38 and 39 and a drive shaft 40. On said drive shaft is supported a pair of conveyor driving sprockets 41 and 42.

Extending between and aligned with the conveyor supporting sprockets 38 and 35 on one side of said conveyor bed and sprockets 39 and 36 on the other side thereof are a pair of conveyor guiding and supporting rails 45 and 46 (Figure 2). The two conveyors 12 and 13 (Figure 4) may be of any conventional and convenient type but preferably are link chains. Said conveyors extend around the sprockets 35, 38 and 41 on the one side of said conveyor bed and 36, 39 and 42 on the other side, thereof respectively. Along their respective upper courses, said conveyor chains are supported by the said rails 45 and 46, whereas, on their return courses said conveyor chains 12 and 13 are given periodic support by a plurality of rotatable return sprockets, two of which appear at 92 and 93 in Figure 4. Said chains are provided with upstanding elements 34, preferably electrically insulated from the chains, for engaging and moving the preforms. Suitable means hereinafter described in detail are provided for driving the conveyor drive shaft 40.

Mounted on the forward section base portion 28 is a pair of roller assembly supports 47 and 48 to which are secured two pairs of guide roller supporting strips. The one pair of strips, comprising the strips 49 and 50 which are separated by the supporting strip spacers 51 and provided with any conventional bearings suitable for supporting the guide rollers 52, is suitably bolted, or otherwise affixed, to said supports 47 and 48.

A similar pair of strips, of which the strip shown at 53 (Figure 2) is the upper one, similarly support another set of guide rollers 54 in such a position that the two said parallel sets of grooved rollers will hold the adjacent edges of a cylindrical barrel preform, which edges are fitted into the grooves of the rollers, a sufficient distance apart to enable them easily to pass the neck 3 of the upper electrode supporting arm.

Extending along each side of the table as illustrated in Figure 4 are the guides 43 and 44 which are supported on the frame of the machine in any convenient manner by the cylindrical article guide support members 30 and 31.

The drive mechanism

Figure 14:
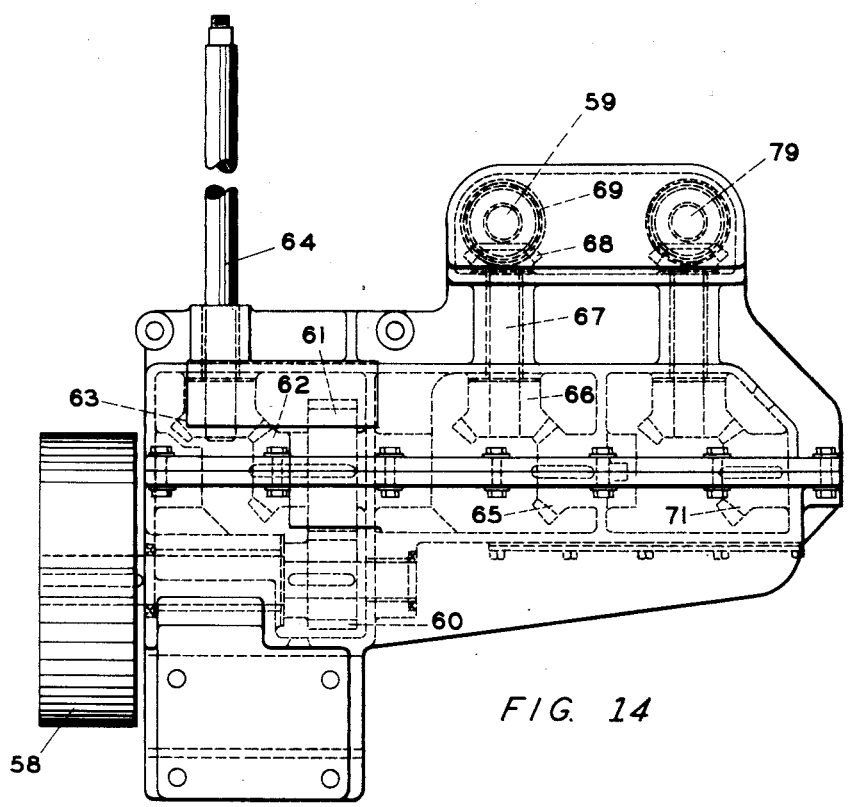
Figure 14 is a phantom detail of the drive gear box assembly taken from the rightward side thereof as appearing in Figure 1 but showing its parts separate from the rest of the machine.

Contained within the framework of the forward section base portion 28 is a prime mover 55, supported by any suitable adjustable base 56 and connected, through suitable transmission means such as a belt 57, to the drive pulley 58 of an appropriate type of speed reduction gear assembly, which is mounted in any convenient manner, as shown, between the forward section 28 and the intermediate section 27 of the base 1. As best shown in Figure 14, said speed reduction gears 60 and 61 are conventionally mounted on suitable shafts supported by conventional bearings and housings. Associated with these parts are means for driving the several movable parts of the welding machine.

Mounted adjacent to the gear 61 is a bevel gear 62 driving another bevel gear 63 which in turn drives a vertical drive shaft 64. This shaft, as hereinafter described in more detail, ultimately drives the upper electrode roller 10.

Also on the same shaft with the driven gear 61 is a bevel gear 65 driving another bevel gear 66, operably mounted on a shaft 67 which, through another pair of bevel gears 68 and 69, ultimately drives the universally jointed shaft 70 (Figure 2) and through it the lower electrode roller 11. Similar means, starting with a bevel gear 71 on the same shaft with the said driven gear 61 are provided for driving the universally jointed shaft 72 and through it the conveyor drive shaft 40.

The shaft 70 comprises the universally jointed sub-shafts 59, 73, 74, this latter being supported by the bearings 75 and 76, and the universally jointed sub-shaft 77, which latter drives, through suitable gearing, such as a worm within a gear box 78, the lower welding electrode roller 11. The shaft 72, comprising the universally jointed sub-shafts 79, 80 and 91 drives, through a gear box 81 as hereinafter further described, the conveyor drive shaft 40.

As shown in Figures 1, 16 and 17, the vertical drive shaft 64 drives the shaft 82 through a pair of bevel gears. Said shaft 82 mounts one of a pair of pinion gears 83 thereby driving the shaft 84 which mounts the other pinion gear. The shaft 84 through a series of suitable universally jointed sub-shafts 85, 86 and 89, as illustrated in Figures 1 and 2, drives, through the gears within the gear box 90, the upper welding electrode roller 10 in a manner to be described in further detail hereinafter. The sub-shaft 86 is supported on the bearings 87 and 88 as shown in Figure 1.

Figure 20:
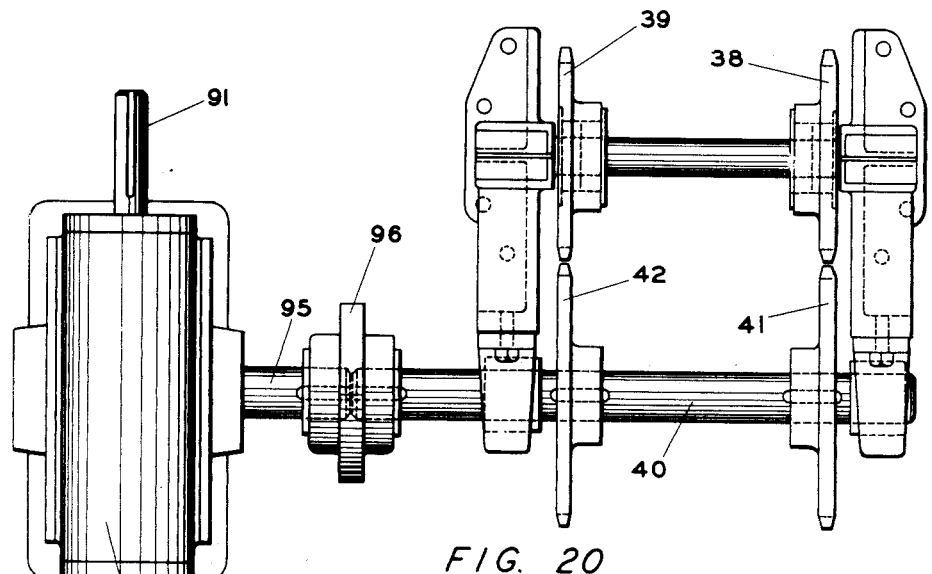
Figure 20 is a top plan view, of the parts shown in Figure 19.
Figure 19:
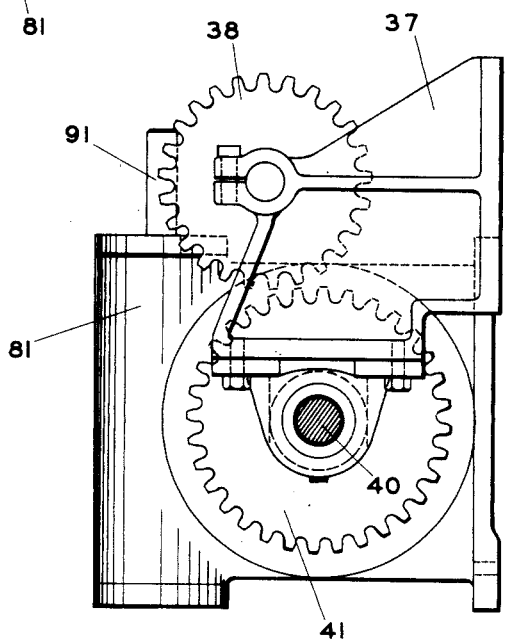
Figure 19 is a side elevation detail of the conveyor drive assembly separated from the mechanism associated therewith.

Referring again to the conveyor drive assembly viewed in Figures 19 and 20, the conveyor drive gear box 81 effects substantial further speed reduction, such as approximately a ratio of 80 to 1 by way of example, in the particular illustrated embodiment of the invention, as it drives the shaft 95 which, through the flexible coupling 96, drives the conveyor drive shaft 40. Thus the conveyor driving sprockets 41 and 42 are caused to rotate for the driving of the conveyor above described.

The lapping guides

Between the rearward edge of the neck 3 and the welding electrodes 10 and 11 is a lap gauge assembly, generally indicated at 100 in Figure 2 and preferably made from steel, which comprises a pair of substantially parallel lap gauge roller supports 101 and 102 as shown in Figures 5 and 6. The upper member 101 is fastened in any convenient manner, as by bolting, to the bottom side of the upper electrode supporting arm 2. The lower member 102 is supported by support pedestal 103, mounted on the upper sheet 26 of the rearward portion 25 of the base 1. This entire assembly is positioned between and within the rearward ends of the conveyor rails 45 and 46 and the conveyor guiding and driving sprockets 38, 39, 41 and 42, so that no interference will occur therebetween. The bolt openings 98 and 99 (Figure 6) in said lap gauge roller supports 101 and 102 respectively are elongated so that the alignment of said upper and lower supports can be precisely adjusted toward and away from each other, and in any angular relation to each other, in planes parallel to the conveyor bed. To each of said lap gauge roller supports 101 and 102 is rotatably secured in any convenient manner a plurality of upper roller members 17 in a single line, and lower roller members 18, also in a single line, respectively, whose construction and relative position is best shown in Figure 7.

Referring then to Figure 7, it will be noted that on the lower side of the upper rollers there is provided a curved surface 108 terminating at its lower and radially innermost extremity in hub 109, The rollers 18 in the lower set are similarly constructed with the curved surface 110 on their upward sides and terminating in a hub 111 whose peripheral surface is parallel to the axis of the roller. The axis of the upper roller may be placed at a small angle to that of the lower roller in a plane transverse to the longitudinal axis of the machine, in order to facilitate the reception of the edge of bent material to be welded, but the periphery of its hub is parallel to the axis of the lower roller 18. These rollers are axially offset with respect to each other, laterally of the direction of travel of the parts to be welded, sufficiently that edges of sheet material placed against the hub of said rollers from opposite sides thereof will overlap each other a determinable amount as described above and indicated in Figure 7, wherein the broken lines indicate the meeting portions of the barrel material to be welded. The rollers may also be adjusted vertically along their respective axes with respect to each other as by proper shims so that the two portions of sheet material overlapped and being guided will be held at least substantially in contact with each other as also illustrated in Figure 7. Suitable bearings and lubrication (not shown), according to any accepted practice, should of course be provided to support, guide, and insure long life and accurate operation of said rollers.

The two substantially parallel banks of lap gauge rollers are flanked on the left side, as appearing in Figure 7, by an upper lap gauge guide bar 104 which is supported by a plurality of upper lap gauge guide bar supports 106. Said banks of rollers are flanked on the right side, as appearing in Figure 7, by a lower lap gauge guide bar 105 which is supported on the pedestal 103 (Figure 5) by a plurality of lower lap gauge guide bar supports 107.

The guide bar 104 is so positioned with respect to the upper lap rollers 17 that the edge of the cylindrical article resting thereon will be held snugly against the radially innermost portion of the curved surface 108 while engaging the hub portion 109 of said roller.

Guide bar 105 is positioned with respect to the lower lap rollers 18 so that the edge of the cylindrical article will be guided thereby onto the curved surface 110 of roller 18 and thence into snug contact with the hub 111 of said roller 18, when said cylindrical article is fed between the forming rolls 4, 5, 6, 7, and 8, which latter are hereinafter described in detail.

*The lower electrode*

Figure 9:
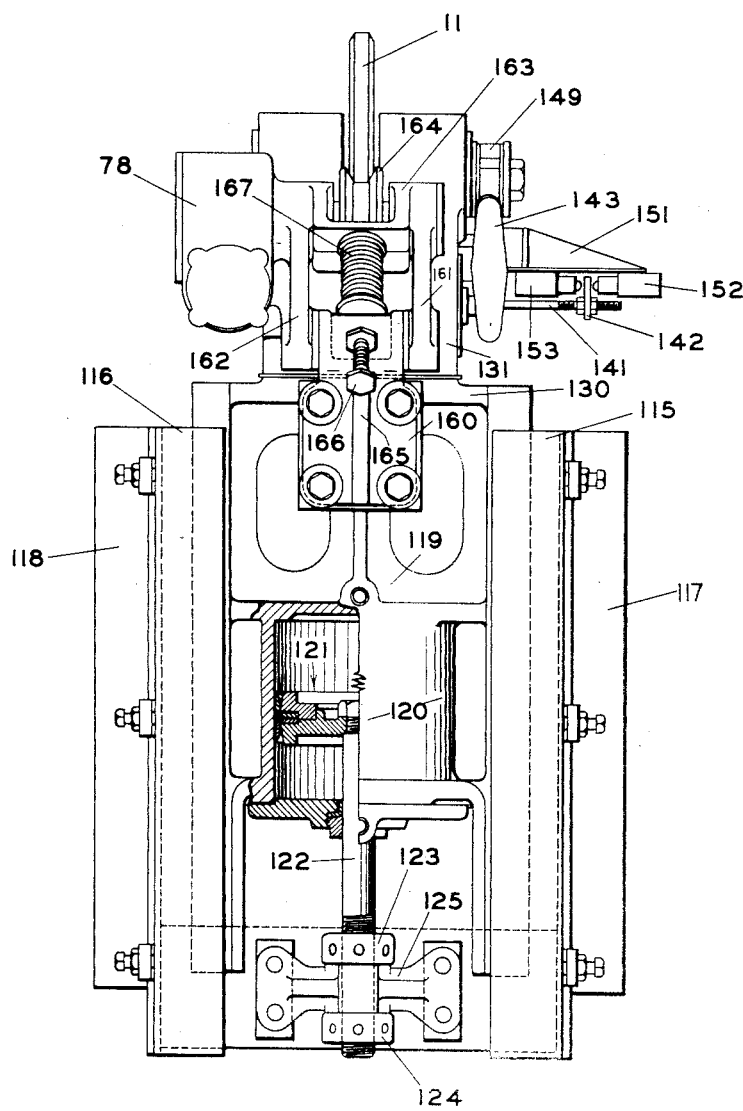
Figure 9 is an end elevation detail of the parts illustrated in Figure 8.
Figure 10:
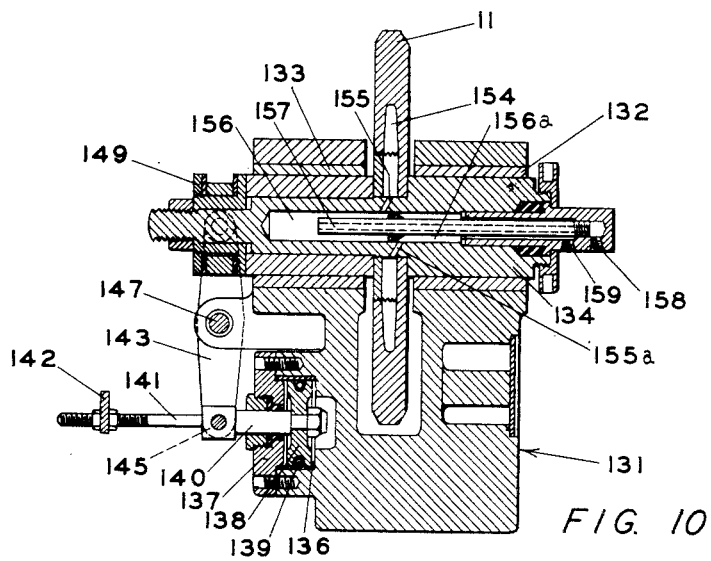
Figure 10 is a section taken on the line X—X of Figure 8.
Figure 11:
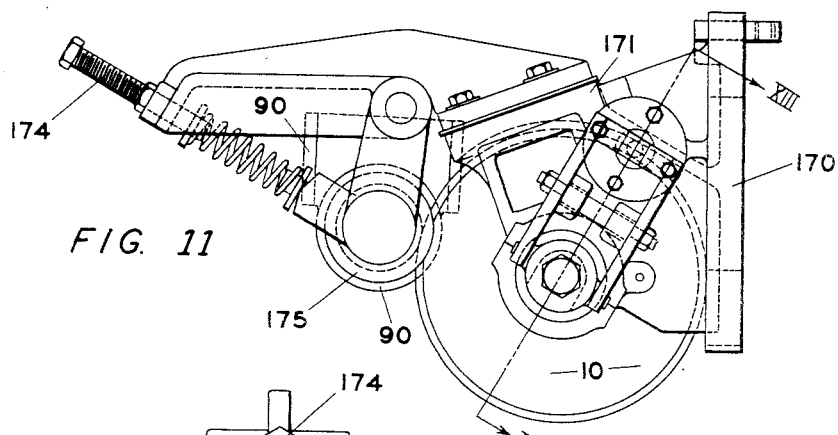
Figure 11 is a side elevation detail of the upper welding electrode and the parts associated with and supporting same.
Figure 12:
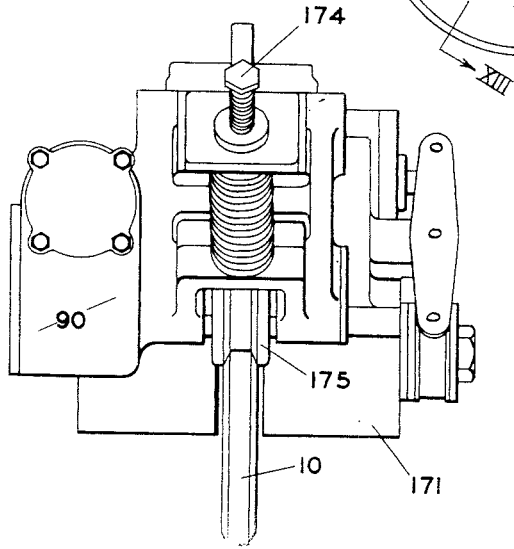
Figure 12 is an end view of the part shown in Figure 11 taken from the leftward end thereof.

Turning now to the lower electrode and associated parts, as detailed in Figures 8, 9, and 10, there is provided a pair of fixed slide guides 115 and 116 bolted or otherwise suitably fastened to associated angle members 117 and 118 by which the following described entire assembly is affixed to the extreme rearward end of the rearward section 25 of the base 1, in the manner shown in Figure 1. A vertically reciprocable slide 119 is held between the guides 115 and 116 for slidable and adjustable relationship therewith. Mounted within said vertically reciprocable slide is the cylinder 120, shown partially sectioned in Figure 9, containing a piston 121 which is operatively connected to a rod 122. The lower end of said rod is threaded and held in vertically adjustable position by the nuts 123 and 124, and the bracket 125. Said bracket is supported by and suitably affixed to the non-moving frame parts of the machine.

At the upper end of the slidable part 119 is a platform 130 to which is fastened, as by bolting, a bearing housing 131 by which the lower welding electrode roller 11 is rotatably supported.

As detailed in the sectional Figure 10, the electrode support 131 is centrally divided to provide a yoke construction for receiving said lower electrode roller and its associated parts. The sleeve bearings shown at 132 and 133 have relatively broad bearing areas and are constructed to permit axial movement of the shaft 134 supporting the electrode roller. It will be observed that the axial thickness of said electrode is sufficiently less than the space between the two bearing supporting arms of the yoked bearing housing 131 to permit limited axial movement of said electrode roller.

At a suitable point within said yoke there is provided a small cylinder 136 which is closed by a gland 137, preferably bolted in place. A reciprocable piston 138 is contained within said cylinder, provided with rings 139, and operatively associated with a piston rod 140. This rod has an extension 141 upon which is held a contact member 142, axially adjustable with respect thereto, for purposes appearing hereinafter. A pair of connecting levers 143 and 144 are pivotally attached at their ends 145 and 146 to said piston rod 140, centrally pivoted at 147 to a pair of supports 148 suitably fixed with respect to the bearing housing 131, and pivotally operable at their other ends with means indicated at 149 which may be of any convenient and well known type by which the shaft 134 of the electrode roller 11 will be axially reciprocated, upon reciprocation of the piston 138, without inhibiting the rotation thereof.

Because of the intense heat created by the electrode rollers during each sustained welding operation, it has been found advantageous to provide a cooling system, such as, for example, illustrated in Figure 10 with respect to the lower electrode assembly.

Water, or any other suitable coolant is circulated in the hollow chamber 154 within the electrode roller, gaining access thereto thru a suitable opening 155 leading thereinto from the hollow center 156 of said shaft 134. Said coolant may be fed into said hollow shaft through a tube 157 by suitable engagement between an inlet means 158 and a coolant supply system, and may be expelled after the cooling operation, through the passageway 155a to the chamber 156a and thence to the outlet means 159 and a coolant return conduit.

It will be understood that the above described cooling system is intended to be illustrative only of one possible means, of which there are many, for cooling said electrode rollers.

As best shown in Figure 9 there is provided an arm 151 extending sidewardly from the bearing housing 131 carrying a pair of sensitive electrical switches 152 and 153. The contact 142 reciprocates between said switches and contacts them alternately, which contacting, through any conventional means (not shown), suitably controls the admission and exhaust of operating fluid into the cylinder 136 by which the piston 138 is caused to reciprocate.

Suitably bolted to the rearward side of the vertically sliding part 119 is the drive mechanism support 160. This pivotally supports the lower ends of a pair of arms 161 and 162 which at their respective upper ends support the yokeshaped guide member 163 which holds the lower electrode drive wheel 164.

The lower electrode drive support 160 has a rearwardly extending arm 165 supporting an adjusting bolt 166 which adjustably supports and bears against a resilient means 167, such as a coiled spring. Said spring contacts the lower end 168 of the yoked guide member 163. Thus, by appropriate rotation of the adjusting bolt 166 the driving wheel 164 is permitted to fall back away from the lower electrode roller 11 or is pushed up against it. In this way, proper adjustment of the contact pressure between said driving wheel and the electrode roller may be readily maintained.

At one side of the driving wheel 164 there is provided a gear box 78 through which the driving wheel 164 is driven by the shaft 70 and its associated sub-shafts above described. In this particular embodiment, and as shown in Figure 21 for illustrative purposes, substantial speed reduction is provided within said gear box 78 by means of a worm gear 177, driven from said shaft 70, cooperating with a gear 178 mounted securely on a suitable shaft 176 upon which said driving wheel 164 is mounted. This method of speed reduction may, of course, be freely substituted by other conventional means for effecting a closely controllable rotational speed of the driving wheel 164.

The upper electrode

Figure 13:
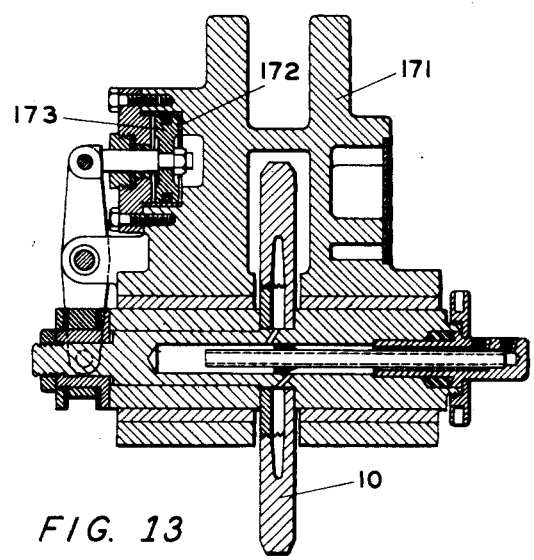
Figure 13 is a section taken on the line XIII—XIII of Figure 11.

Turning now to the upper welding electrode as illustrated in Figures 3, 11, 12 and 13 there is provided a sub-frame base 170 which is bolted or otherwise conveniently fastened to the extreme rearward end of the arm 2. Supported on said base and conveniently an integral part thereof is an upper electrode bearing housing 171 which, as best shown in Figure 13, supports the upper welding electrode roller 10 through bearings and shaft construction substantially similar to, or identical with, that already described with respect to the lower welding electrode. A cylinder 172, containing a reciprocable piston 173, actuates mechanism identical with that already described with respect to the lower welding electrode and thereby causes similar axial reciprocation of the upper welding electrode roller. The admission and exhaust of operating fluid from said cylinder 172 is controlled by the same mechanism that controls the admission and exhaust of working fluid to and from the cylinder 136 associated with the lower welding electrode roller. An upper welding electrode driving wheel 175 is provided and is mounted by means identical with means already described for adjustably mounting the driving wheel of the lower welding electrode. Said upper driving wheel 175 is driven through a gear box 90 substantially identical with the gear box 78 illustrated in Figure 22 for the lower driving wheel, and the operating parts of said gear box 90 are driven, as above described, by the rotatable shaft which comprises the universally jointed sub-shafts 84, 85, 86 and 89.

By driving the electrodes through the said driving wheels it is assured that the lineal speed of the work passing through the welding zone will be uniform regardless of electrode wear and thus may be kept properly synchronized with the conveyor. Thus, by proper selection of the gearing within the respective drive wheel gear boxes 78 and 90, the welding electrode rollers may be caused to rotate at any selected speed which may, as desired, be the same or different for each of said electrodes. By adjustment of either or both the upper and lower electrode driving wheel adjusting bolts 174 and 166, respectively, any desired pressure may be caused to exist between said driving wheels and said welding electrodes as heretofore described in detail with respect to the lower electrode mechanism.

The above mentioned axial reciprocation of the upper and lower welding electrodes may, as above indicated, be controlled as desired. However, said upper and lower welding electrode rollers are preferably caused to oscillate substantially in unison across the barrel seam. The magnitude of said oscillating movement is such that the point of pressure of the seam against the electrodes moves substantially across the full extent of the unchamfered peripheral surface of both electrodes. Thus, the wear on the electrodes will be practically uniform across the whole of such peripheral surfaces.

The forming rolls

Placed in the vicinity of the welding electrodes is a plurality of forming rolls as above described. Since the said rolls are substantially identical, detailed description will be given only with reference to the forming roll 8, shown in Figures 1, 2 and 18 as directly over the welding electrodes and arranged on a substantially horizontal axis, and such description will be assumed as essentially applicable to the other rolls as well.

Referring now to Figure 18 there is shown the bracket 180 which is suitably fastened, as by bolting, to a forming roll supporting frame 189 (Figure 3) which in turn is fastened in any convenient manner, as by bolting, to the rearward end of the base 1. The bracket 180 includes a head part 181 supporting therethrough a shaft 182 which extends equal distances on either side of said bracket head. The roll comprises a hub 183 which receives the shaft 182 rotatably therewithin and is supported with respect to said shaft on bearings of any convenient type, such as ball bearings, as shown in Figure 18. Radially outward from said hub is a plurality of spokes 184 which support the surface sheet 185 which may be integral therewith or built up from separate parts. A plurality of shallow circumferential grooves 186 are provided in the said peripheral surface which grooves function to diminish the frictional impedance set up between their surfaces and the cylindrical article being welded, by the variations in rotational speed of the various points axially along the surface of the said forming roll. In order to further decrease the resistance resulting from said speed differential, the said forming roll may be segmented into a plurality of independently rotatable sections, herein numbering six for illustrative purposes and indicated as 194, 195, 196, 194a, 195a, and 196a.

It will be apparent that this said segmentation makes possible the production of six independent rotational speeds within one forming roll to accomplish substantial adjustment to the varying speed differential of the various diameters in the forming rolls.

The forming rolls 4 and 5 are supported on either side of the lap gauge roller assembly 100 upon the vertical legs 187 and 188 of the frame 189 in any convenient manner, as by bolting their respective supporting brackets thereto. Said forming rolls 4 and 5 are spaced such a distance apart depending upon the size of barrels being handled, that, as the preforms pass between said rolls, the overlapped edges will be caused to bear tightly against the guiding hubs of the several lap gauge rollers. The rearward forming rolls 6 and 7 are supported by their respective brackets also on the upright parts 187 and 188 of the forming roll supporting frame 189, and are supported in such position with respect to each other and with respect to the forming roll 8 that they will assist the rolls 4 and 5 in holding the preforms in such position as described above that their edges to be welded will be in the correct overlapped position with respect to each other and will be smoothly guided between the welding electrodes.

The controlling mechanism

For the imposition of proper pressure onto the weld, as is desirable in conventional seam welding practice, the pressure fluid admitted into the cylinder 120 above the piston 121 is effectively controlled in any conventional manner and by any conventional mechanism. Being conventional and selectable from many different types well known to the trade, it is not here shown. Likewise, the means operating the pistons, causing axial reciprocation of the welding electrode rollers, may be accomplished in any one of many ways which are well known for causing controlled reciprocation of pistons and hence is not here shown. However, it may be said by way of example that a compressed air system provided with conventional regulatory and control means has been found highly effective for accomplishing these ends.

The electrical circuit throughout is likewise conventional. It is, of course, necessary to effect driving of the motor and supplying properly modulated current to the welding electrodes through a suitable transformer heretofore mentioned and timing mechanism, but all this is done in an entirely conventional manner and by well known means, and hence needs no description.

Associated mechanism

While many forms of feeding mechanism 21 may be employed for moving the preform from the bending machine to the conveyor portion of the welder, it has been found convenient to provide an actuating cylinder 190 mounted at its rearward end on the housing of the gear mechanism associated with the upper end of the vertical drive shaft 64, and at its forward end on a bracket 191 which may be supported in any convenient manner, as by mounting directly onto the preform bending machine 20. Within said cylinder is a piston (not shown) operating selectively and timeably in either direction and thus reciprocably actuating a rod 192. Said rod has engaging means 193 at its free end for engaging a preform and pulling it into the welder. Said rod operates substantially along the center line of the preform, excepting only for laterally extending engaging means 193 (Figures 1 and 2) so that said preform will straddle the rod and its driving cylinder 190 and be readily movable past same under the urging of the conveyor.

This rod will be actuated by the said driving cylinder through any convenient means, such as compressed air fed alternatively to each side of the piston by any convenient means, and timed appropriately to the shaping of the preforms and to the speed of operation of the welding mechanism.

Operation

Although the operation of the above described machine has been indicated in the foregoing description of the parts concerned it will be here summarized.

Suitably bent sheet material is received onto the forward end of the welding machine from any convenient source, such as a bending machine shown at 20 in Figures 1 and 2, or suitable prebent sheets may be fed onto the welding machine by hand if preferred. The preformed sheets are placed onto the machine in such a manner that their adjacent edges are received into the grooves of the forward guide rollers 14 and 15 while their curved sides rest against the guides 43 and 44. The conveyor by means of suitable upstanding engaging elements 34, engages the preform and moves it rearwardly of the welding machine toward the welding zone.

As the preform approaches the neck 3 of the machine, its adjacent edges are held apart by the rollers immediately ahead of said neck and are moved onto the spreader guide blocks 23 and 24 mounted at the base of said neck 3. Thus the preform is moved past the neck and moves into position between the neck and the welding zone of the machine, at which time it is surrounding the arm 2 which supports the upper welding electrode.

As soon as the preform has entirely passed the said neck, it will be urged by the conveyor between the forming rolls 4 and 5 which cause said adjacent edges to be overlapped as they are received by the guide lap rollers 17 and 18. The magnetic effects induced around the upper electrode conductor 33a and concentrated in the metallic preform will assist said rolls by holding said preform tightly against the guide lap rollers. The preform is now positioned for movement through the welding zone wherein the overlapped edges are welded to form the desired seam. In the welding zone the sheet material is held against improper expansion and consequent withdrawal of the adjacent edges from their overlapped or seam-forming position by the second set of forming rolls indicated as 6, 7, and 8. During the initial stages of welding an individual item, excessive overlapping is prevented because the major part of the preform is still being held in proper overlapped relationship by the rearwardmost of the guide rollers 17 and 18. During the final stages of the welding operation such excessive overlapping is prevented by the fact that most of the article has already been welded, thereby securing a fixed relationship between said overlapped edges.

Thus, there is provided a continuous, fully automatic operation in which the preformed material is conveyed on top of the operating table for more convenient handling thereof and in which the preforms are firmly held and guided in the desired position prior to and during the welding operation.

Modifications

While a particular embodiment of the invention has been selected for purposes of illustration and many details have been introduced for purposes of clarity during the course of such illustration, it will be evident that a wide variety of modifications may be made to the machine illustrated without departing from the scope of the invention. Further, it will be understood that the type of welding machine hereindisclosed may be applied to weld cylindrical shells in any ordinary size and dimension, although the particular embodiment herein selected for illustrative purposes relates to the welding of relatively large shells in which the diameter is in the nature of about 10 inches or larger.

In view of the foregoing, it will be evident that insofar as the general arrangement of the machine is concerned it is conceivable to substitute for the drive mechanism shown, a plurality of motors directly driving the conveyor and the upper and lower electrode drive wheel, and excepting as the hereinafter appended claims refer to the drive mechanism specifically, such substitution thereof will be considered within the scope of the invention. It will likewise be understood, in view of the foregoing, that the particular means shown as immediately driving the welding electrodes is only one of several ways which are well known to the trade and of which any may be provided without departing from at least the broader principles of the invention.

Further, in view of the foregoing it will be evident that some of the principles of the above disclosed invention may be incorporated into a gas or arc welding device instead of electrical resistance welding device as above described. While such alteration will change the actual welding mechanism and the precise means for operating it, the overall construction and operating principle of the illustrated machine, excepting as the same particularly relates to the electrodes, will not be materially affected.

It will be understood that the length of the arm supporting the upper welding element will normally be longer than the axial length of the part being welded in order to permit said parts to come together fully in overlapped relationship prior to their entry into the welding zone. However, where an article having extremely great axial length in relation to its diameter is to be welded, such as large conduits or tubing, it is possible for the material being welded to extend past said neck providing only said neck is sufficiently spaced from the welding zone to permit the material being welded to come together accurately into the desired position.

It will also be understood that although the foregoing description has been given in terms of overlapped seam welding it is entirely possible by appropriate modification of the guide rollers and associated parts to adapt the machine for butt welding.

Other modifications and variations may be made within the knowledge of persons acquainted with equipment of this general type without departure from the scope of this invention as defined by the hereinafter appended claims.

I claim:

1. In a machine for making the cylindrical portion of a barrel by welding together the longitudinal, parallel edges of a piece of sheet material bent into a cylindrical form, the combination comprising: an elongated base; a lower circular electrode and means rotatably supporting same on said base; an arm longer than said cylindrical form spaced above and substantially parallel with said base, and an upper circular electrode rotatably supported upon said arm for cooperation with said lower electrode; an upstanding neck supporting said arm at a point remote from said upper electrode, said neck being supported upon said base; upper and lower, vertically and horizontally spaced lap rollers having substantially vertical axes and arranged in two, parallel, laterally offset and overlapping rows between said electrodes and said neck and disposed on opposite sides of, and equally spaced from, a line passing between said electrodes, through said neck and parallel with said base, said lap-rollers having concentric, cylindrical portions of reduced diameter extending toward a plane including said line and parallel with said base a distance substantially equal to the thickness of said sheet material, said cylindrical portions each terminating substantially within said plane, and the upper row of cylindrical portions being laterally spaced from the lower row of cylindrical portions a distance equal to the desired overlap of the parallel edges of said form, thereby holding said edges in face to face contact throughout their lengths; means energizing and rotating said electrodes; continuously acting means for urging said form past said neck and onto said lap-rollers; and means near said electrodes engaging said form for controlling the shape thereof, and holding said edges thereof snugly against said cylindrical portions of said lap-rollers.

2. The apparatus defined in claim 1 wherein the last-named means comprises a plurality of hour-glass rolls each extending around the bent sheet in excess of one-fourth of the total circumference thereof.

3. The apparatus defined in claim 1 wherein the continuously acting means includes a pair of conveyor chains arranged parallel with and spaced laterally from the lap-rollers and extending past said neck on either side thereof.

4. The apparatus defined in claim 1 wherein the arm is substantially smaller in its largest transverse dimension than the diameter of said form.

5. The apparatus defined in claim 1 wherein the lap-rollers in cross section upon any diameter are each tapered from the radius of the cylindrical portion to the periphery of each thereof, thereby providing means guiding said edges of the cylindrical form to their positions of overlapping contact with each other, and seating them against said cylindrical portions.

HOWARD C. COGAN.

REFERENCES CITED

The following references are of record in the file of this patent:

UNITED STATES PATENTS

| Number | Name | Date |
|---|---|---|
| 1,344,415 | Longacre | June 22, 1920 |
| 1,808,261 | Sessions | June 2, 1931 |
| 1,854,957 | Richard | Apr. 19, 1932 |
| 1,994,111 | Rocchi | Mar. 12, 1935 |
| 2,013,517 | Kachel | Sept. 3, 1935 |
| 2,084,889 | Blevins | June 22, 1937 |
| 2,177,104 | Gonser | Oct. 24, 1939 |
| 2,275,274 | Wallace | Mar. 3, 1942 |
| 2,407,676 | Munson | Sept. 17, 1946 |
| 2,444,465 | Peters | July 6, 1948 |
| 2,454,948 | Seltzer | Nov. 30, 1948 |

FOREIGN PATENTS

| Number | Country | Date |
|---|---|---|
| 263,783 | Great Britain | Mar. 3, 1927 |